United States Patent
Chung et al.

(10) Patent No.: US 7,362,411 B2
(45) Date of Patent: Apr. 22, 2008

(54) PATTERN MASK, LIQUID CRYSTAL INJECTION PROCESS, AND METHOD OF FABRICATING LCD DEVICE USING THE SAME

(75) Inventors: Hyun-Sang Chung, Gyeonggi-do (KR); Young-Suk Park, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/703,815

(22) Filed: Feb. 8, 2007

(65) Prior Publication Data

US 2007/0146623 A1 Jun. 28, 2007

Related U.S. Application Data

(62) Division of application No. 10/880,095, filed on Jun. 30, 2004, now Pat. No. 7,227,610.

(30) Foreign Application Priority Data

Nov. 8, 2003 (KR) .......................... 2003-0078855

(51) Int. Cl.
*G02F 1/1341* (2006.01)

(52) U.S. Cl. ..................................... 349/189

(58) Field of Classification Search ................ 349/187, 349/189, 154; 438/30; 427/164
See application file for complete search history.

(56) References Cited

U.S. PATENT DOCUMENTS

| 6,738,126 | B1 | 5/2004 | Chung et al. | |
| 6,929,967 | B2 | 8/2005 | Lee et al. | |
| 2001/0039891 | A1* | 11/2001 | Takeuchi et al. | 101/128.21 |
| 2003/0056665 | A1* | 3/2003 | Tanaka | 101/127.1 |
| 2003/0093172 | A1 | 5/2003 | Lee | |

FOREIGN PATENT DOCUMENTS

| JP | 03-236974 | | 10/1991 |
| JP | 11-109375 A | * | 4/1999 |

* cited by examiner

*Primary Examiner*—James A. Dudek
(74) *Attorney, Agent, or Firm*—McKenna Long & Aldridge LLP

(57) ABSTRACT

A liquid crystal injection method for fabricating a liquid crystal display (LCD) device includes attaching a liquid crystal material to a pattern mask to form a liquid crystal film, and printing the liquid crystal film on a substrate for the LCD device by pressing the pattern mask to the substrate.

8 Claims, 9 Drawing Sheets

PATTERN MASK, LIQUID CRYSTAL INJECTION PROCESS, AND METHOD OF FABRICATING LCD DEVICE USING THE SAME

This application is a Divisional of prior application Ser. No. 10/880,095, filed Jun. 30, 2004 now U.S. Pat. No. 7,227,610, which claims the benefit of Korean Patent Application No. 2003-0078855 filed in Korea on Nov. 8, 2003, which is hereby incorporated by reference in its entirety as if fully set forth herein.

The present invention claims the benefit of Korean Patent Application No. 2003-0078855 filed in Korea on Nov. 8, 2003, which is hereby incorporated by reference.

BACKGROUND OF THE INVENTION

1. Field of the Invention

The present invention relates to a liquid crystal display (LCD) device, and more particularly, to a pattern mask, a liquid crystal injection process and a method of fabricating an LCD device using the same.

2. Discussion of the Related Art

In general, an LCD device includes an array substrate where thin film transistors are arranged in a matrix form, a color filter substrate where color filters are formed, and a liquid crystal layer interposed between the array substrate and the color filter substrate.

A liquid crystal (LC) cell is fabricated by aligning the array substrate with the color filter substrate such that a common electrode of the color filter substrate faces a pixel electrode of the array substrate, a liquid crystal material is then injected into a gap between the array substrate and the color filter substrate, an injection hole is sealed, and then polarizers are attached on the outer sides of the two substrates. Light transmittance of the LC cell is controlled by a voltage applied to the pixel and common electrodes, and an image is displayed by a light shutter effect.

The LC cell forming process includes forming alignment layers and an LC cell gap, and cutting cells, while an array substrate forming process and a color filter substrate forming process include repeated processes.

FIG. 1 is a flow chart showing a process of fabricating an LC cell according to the related art. In FIG. 1, a step S1 includes preparation of an array substrate having thin film transistors and pixel electrodes, and a color filter substrate having a color filter layer and a common electrode.

Next, a step S2 includes formation of first and second alignment layers on the pixel electrode and the common electrode, respectively. The formation of the first and second alignment layers includes coating thin polymer films, such as polyimide, on the pixel and common electrodes, and rubbing the thin polymer films in a predetermined direction using a rubbing fabric. The thin polymer films must have a uniform thickness, and the rubbing process must be performed uniformly along the thin polymer films. Accordingly, an initial orientation of liquid crystal molecules is determined by the rubbing process. The liquid crystal molecules are moved by the rubbing to display uniform images.

Then, a step S3 includes formation of a seal pattern on either the array substrate or the color filter substrate, thereby providing a cell gap for accommodating a liquid crystal material between the array substrate and color filter substrate. In addition, the seal pattern prevents the injected liquid crystal material from leaking through the seal pattern. The seal pattern is commonly formed by using a screen-printing method or a dispensing method that includes a mixture of thermosetting resin and glass fiber.

During a step S4, a plurality of spacers are sprayed on one of the array substrate and color filter substrate using a spacer spraying method to maintain a uniform gap between the array substrate and the color filter substrate. The spacer spray method can be divided into two different types, such as a wet spray method that includes spraying a mixture of alcohol and spacer material, and a dry spray method that includes spraying spacer material alone. Here, the seal pattern and the spacers are formed on different substrates. For example, the seal pattern may be formed on the color filter substrate that has a flat surface, and the spacers may be formed on the array substrate.

At a step S5, the array substrate and color filter substrate are aligned and are attached to each other along the seal pattern. An alignment accuracy of the substrates is determined by an alignment margin, wherein the alignment accuracy of several micrometers is required since light leakage occurs if the substrates are misaligned beyond the alignment margin.

At a step S6, the attached substrates are divided into unit cells using a cell cutting process because a plurality of liquid crystal cells are formed on a large substrate. The cell cutting process includes a scribing process that forms scribe lines on a surface of the substrate using a diamond pen or a cutting wheel of tungsten carbide, wherein a hardness of the diamond pen or cutting wheel is higher than a hardness of the substrate, which is formed of glass. Then, a breaking process is performed to divide the unit cells by applying a force.

AT a step S7, a liquid crystal material is injected into each individual unit cells between two substrates using a vacuum injection method, wherein each unit cell has an area of several square centimeters and a cell gap of several micrometers. The vacuum injection process employs a pressure difference between an interior of the unit cell and an exterior of the unit cell.

FIG. 2 is a cross-sectional view schematically illustrating a liquid crystal injection process using a vacuum injection method according to the related art, and FIG. 3 is a flow chart showing the liquid crystal injection process of FIG. 3. As shown in FIG. 2, in order to inject a liquid crystal material 10 into a liquid crystal cell 2, a vacuum chamber 6 where the liquid crystal cell 2 is placed therein and a container 8 is filled with the liquid crystal material 10.

First, at a step S10 of FIG. 3, the liquid crystal cell 2 is disposed in the vacuum chamber 6 where the liquid crystal material 10 is to be injected into the liquid crystal cell 2, and then air in the liquid crystal cell 2 is removed. On the other hand, the container 8 is disposed in a bubble removing room, and then air in the liquid crystal material 10 within the container 8 is removed. At this time, the vacuum chamber 6 has an inner pressure of about $10^{-6}$ Torr and the bubble removing room has an inner pressure of about $10^{-3}$ Torr.

If fine bubbles in the liquid crystal material 10 are injected into the liquid crystal cell 2, the fine bubbles are combined to form large foams as time passes. Thus, a bubble removing process should be performed. That is, the liquid crystal material 10 is left under a vacuum condition for a long time to remove the fine bubbles in the liquid crystal material 10. The bubble process may be carried out by simultaneously loading the liquid crystal material 10 while the inside of the liquid crystal cell 2 is under vacuum.

A dipping method that the unit liquid crystal cell 2 is soaked in a liquid crystal tray has been widely used, but consumes a large amount of the liquid crystal material 10. For this reason, a touch method that only an injection hole 4 touches the liquid crystal material 10 may be used. Hereinafter, the touch method will be explained.

After the air in the liquid crystal cell 2 and the fine bubbles in the liquid crystal material 10 are sufficiently removed, at a step S20, the container 8 including the liquid crystal material 10 is located in the vacuum chamber 6 as shown in FIG. 2, and the injection hole 4 of the liquid crystal cell 2 is dipped into the container 8. Since there is no difference in pressure between the liquid crystal material 10 and the inside of the liquid crystal cell 2, the liquid crystal material 10 is injected into the inside of the liquid crystal cell 2 due to the capillary phenomenon at the initial stage of the liquid crystal injection.

After that, at a step S30, a slow vent process that a nitrogen gas ($N_2$) is injected into the vacuum chamber 6 is performed to maintain the inside of the vacuum chamber 6 under the atmospheric pressure. Then, the liquid crystal material 10 is injected into the inside of the liquid crystal cell 2 due to the difference in pressure between the liquid crystal material 10 and the inside of the liquid crystal cell 2.

At a step S40, when the inside of the liquid crystal cell 2 is perfectly filled with the liquid crystal material 10, the liquid crystal cell 2 is left under the atmospheric pressure for about 2 hours.

Accordingly, the liquid crystal material 10 is injected in the liquid crystal cell 2 through the above-described processes. Injection time of the liquid crystal material 10 depends on a size of the liquid crystal cell 2. A 10.4 inch liquid crystal cell requires about 6 hours 50 minutes, a 12.1 inch liquid crystal cell requires about 8 hours, and a 14.1 inch liquid crystal cell requires about 10 hours. After the vacuum injection process is completed, the injection hole 4 is sealed to prevent leakage of the liquid crystal material 10 out of the liquid crystal cell 2. In general, an ultraviolet (UV) curable resin is injected into the injection hole using a dispenser, and ultraviolet light is irradiated onto the resin to harden the resin and seal the injection hole 4.

However, the vacuum injection process is time-consuming and wastes a large amount of the liquid crystal material. In addition, problems in the liquid crystal cell may be caused because it is difficult to control an amount of the injected liquid crystal material during the injection process. Moreover, an accompanying apparatus such as the vacuum chamber should be fully equipped.

SUMMARY OF THE INVENTION

Accordingly, the present invention is directed to a pattern mask, a liquid crystal injection process and a method of fabricating a liquid crystal display (LCD) device using the same that substantially obviate one or more problems due to limitations and disadvantages of the related art.

An object of the present invention is to provide a pattern mask and a liquid crystal injection process using the same that reduces a processing time and a quantity of a liquid crystal material.

Another object of the present invention is to provide a method of fabricating an LCD device that prevents display of images with poor quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal injection process for fabricating an LCD device includes attaching a liquid crystal material to a pattern mask to form a liquid crystal film, and printing the liquid crystal film on a substrate for the LCD device by pressing the pattern mask to the substrate.

In another aspect, a pattern mask for injecting a liquid crystal material includes a mesh pattern on a surface of the pattern mask, and the pattern mask is used for holding a liquid crystal material and printing a liquid crystal film to a substrate.

In another aspect, a method of fabricating an LCD device includes attaching a liquid crystal material to a pattern mask to form a liquid crystal film, printing the liquid crystal film on a first substrate by pressing the pattern mask to the first substrate, and attaching the first substrate having the liquid crystal film thereon with a second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, similar reference numbers will be used throughout the drawings to refer to the same or like parts.

FIGS. 4A to 4F are cross-sectional views illustrating a liquid crystal injection method according to an embodiment of the present invention. FIG. 5 is a perspective view of a pattern mask according to an embodiment of the present invention.

Figure 1:
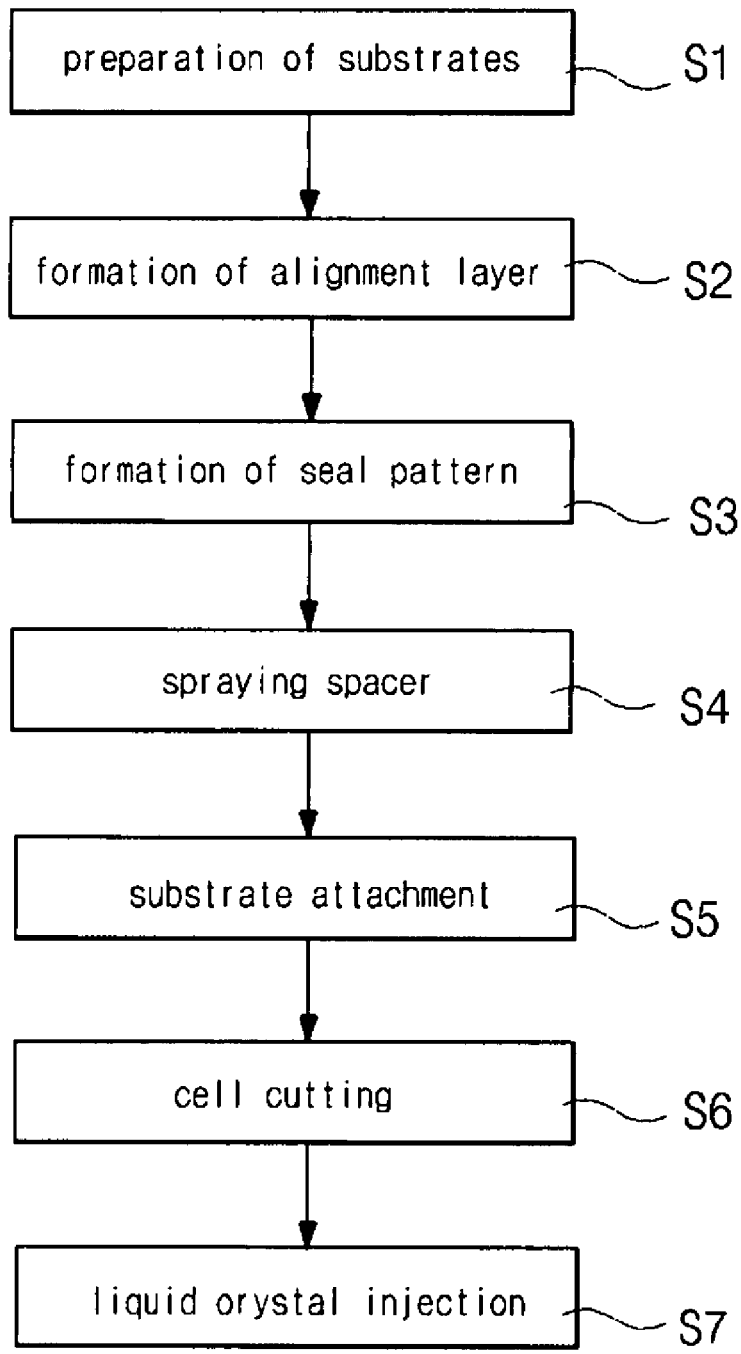
FIG. 1 is a flow chart of a fabrication process of a liquid crystal cell according to the related art.
Figure 2:
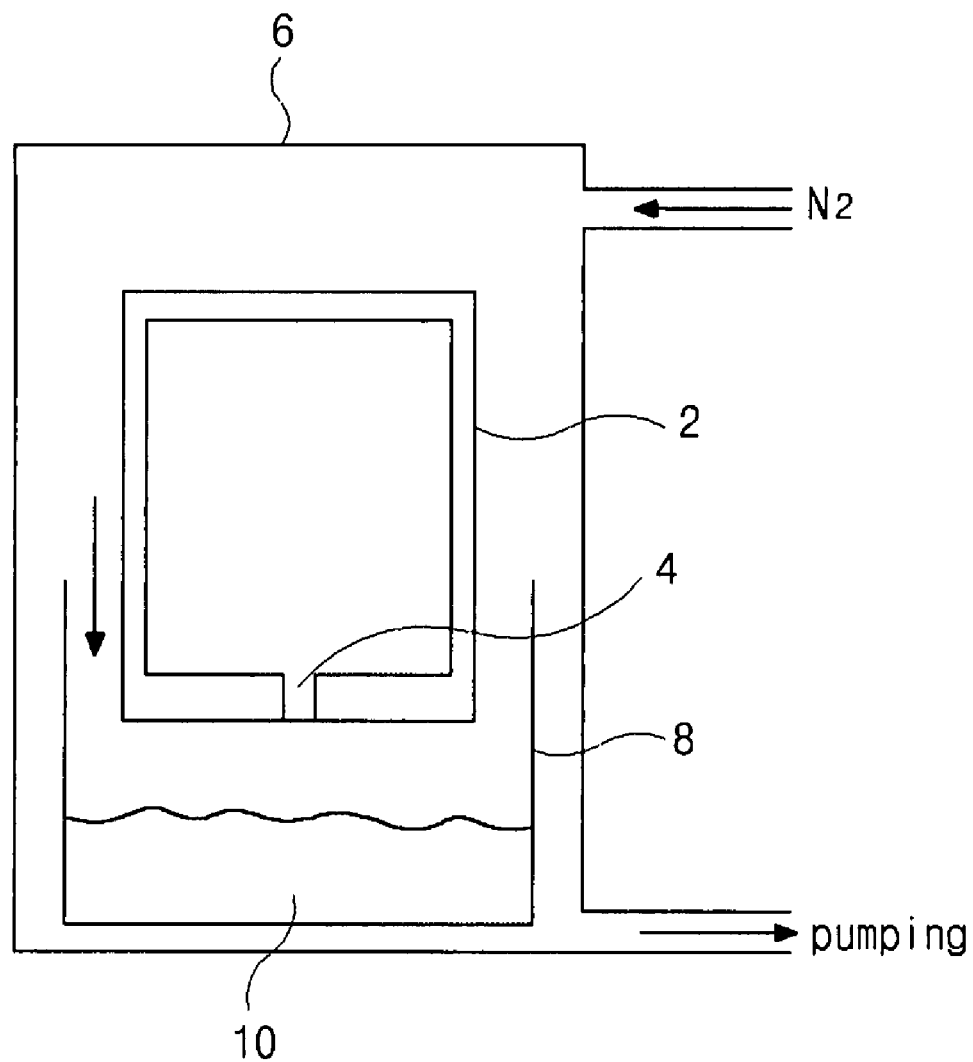
FIG. 2 is a cross-sectional view schematically illustrating a liquid crystal injection process using a vacuum injection method according to the related art.
Figure 3:
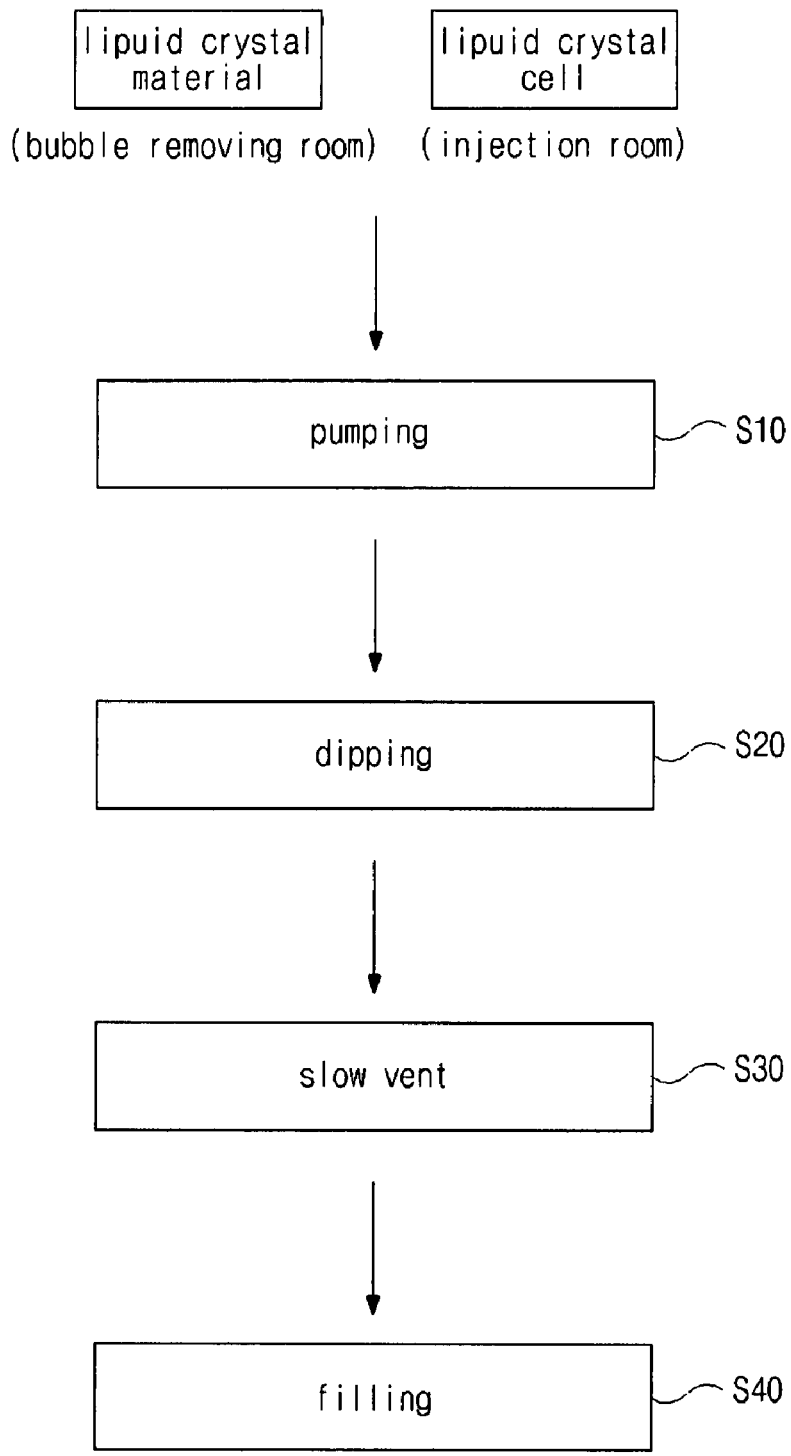
FIG. 3 is a flow chart showing the liquid crystal injection process of FIG. 3.
Figure 4A:
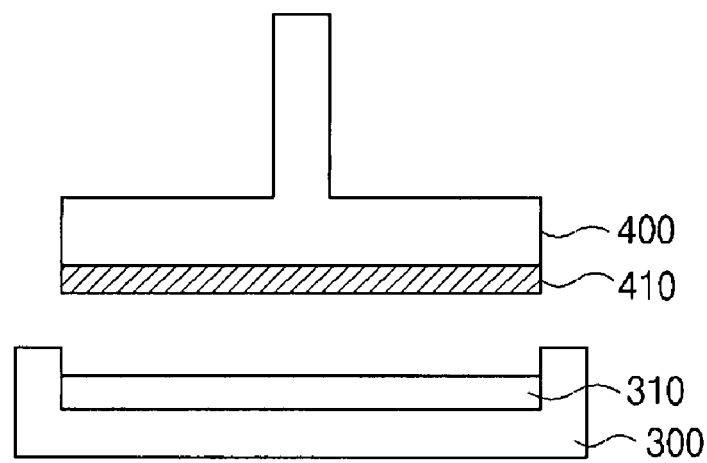
FIGS. 4A to 4F are cross-sectional views illustrating a liquid crystal injection method according to an embodiment of the present invention.
Figure 5:
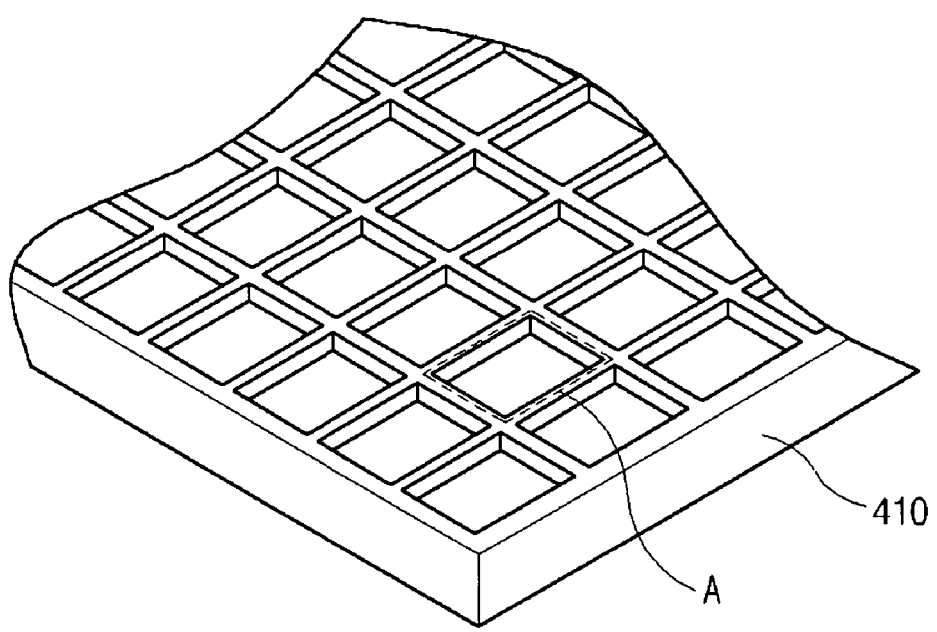
FIG. 5 is a perspective view of a pattern mask according to an embodiment of the present invention.

As shown in FIG. 4A, a liquid crystal material 310 is included in a liquid crystal tray 300 and a pattern mask 410 is prepared as a tool for transferring the liquid crystal material 310. The pattern mask 410 transfers the liquid crystal material 310 in the tray 300 onto a substrate (not shown), and has a size substantially matching the substrate. The pattern mask 410 may be formed of a plastic material or a metal material. As illustrated in FIG. 5, the pattern mask 410 has a surface of a mesh type that contacts the liquid crystal material 310. That is, the pattern mask 410 includes a plurality of prominences A having inner parts and arranged in a lattice form. The prominences A may be disposed on the same plane.

An accurate amount of the liquid crystal material 310 is determined by accuracy of the mesh. The pattern mask 410 is attached to a supporter 400 that holds and moves the pattern mask 410. The liquid crystal tray 300 is a container for accommodating the liquid crystal material 310. The liquid crystal tray 300 has a size substantially matching the pattern mask 410. The liquid crystal tray 300 carries the liquid crystal material 310 where the bubbles are removed.

Figure 4B:
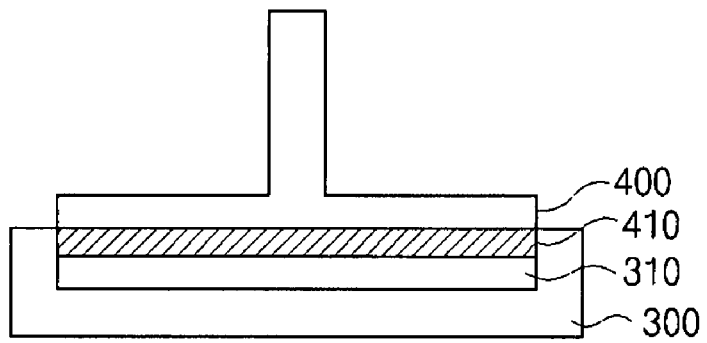

Next, in FIG. 4B, the pattern mask 410 is dipped into the liquid crystal tray 300 and the liquid crystal material 310 is attached to the pattern mask 410.

Figure 4C:
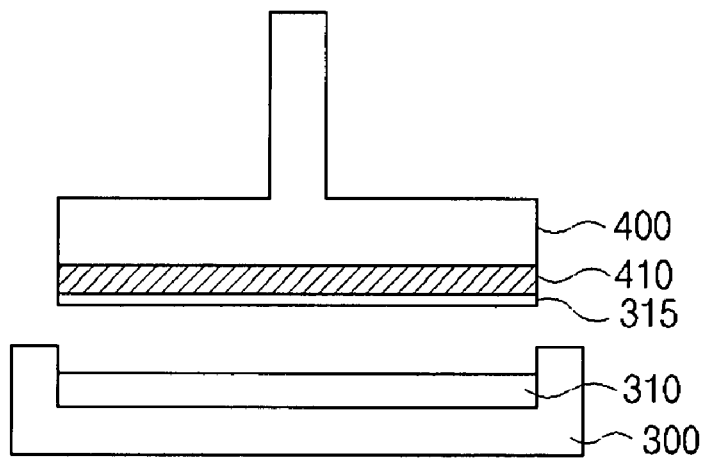

In FIG. 4C, the liquid crystal material 310 in the liquid crystal tray 300 is attached to the pattern mask 410 due to the surface tension. Thus, a liquid crystal film 315 having about 5 micrometer (μm) to 10 micrometer (μm) thickness is formed. As stated above, since the pattern mask 410 has a surface of the mesh type, the liquid crystal material 310 is easily attached to the pattern mask 410.

Figure 4D:
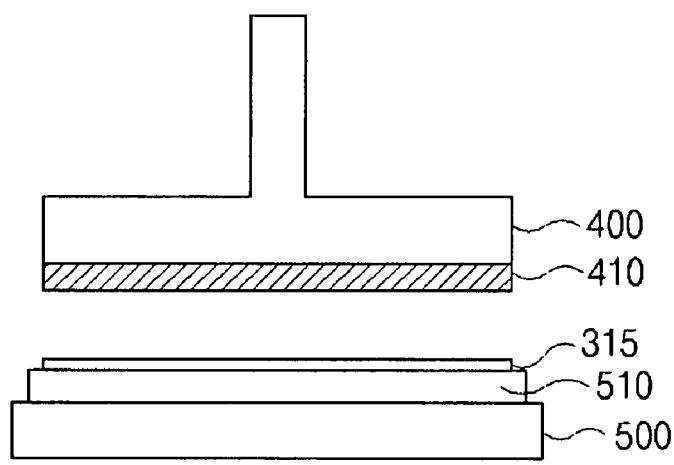

In FIG. 4D, the pattern mask 410 including the liquid crystal film 315 is aligned with a substrate 510, which is located on a substrate stage 500. To completely transfer the liquid crystal film 315 to the substrate 510, the pattern mask 410 and the substrate 510 are aligned by minutely moving the substrate stage 500.

Figure 4E:
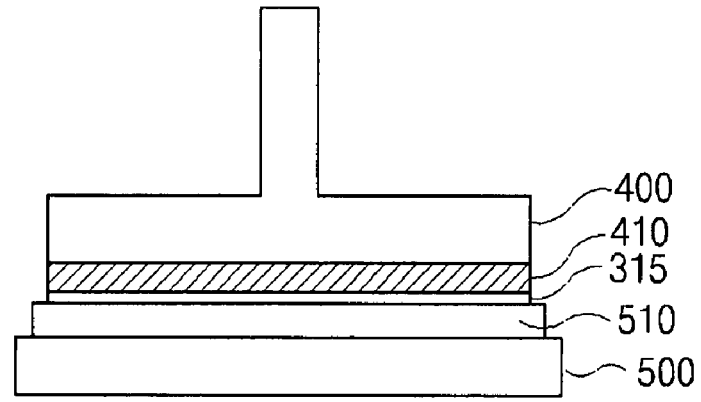

Next, in FIG. 4E, the liquid crystal film 315 is printed to the substrate 510 by pressing the pattern mask 410 on the substrate 510. Here, the substrate 510 may be one of a color filter substrate including a color filter layer and an array substrate including a thin film transistor.

Figure 4F:
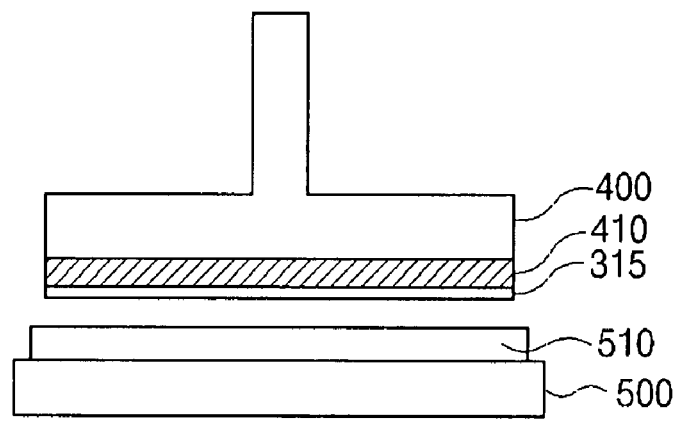

In FIG. 4F, the pattern mask 410 is separated from the substrate 510, and the printed liquid crystal film 315 spreads toward peripheral portions of the substrate 510. The liquid crystal film 315 diffuses to a seal pattern (not shown) formed on the substrate 510.

Figure 6A:
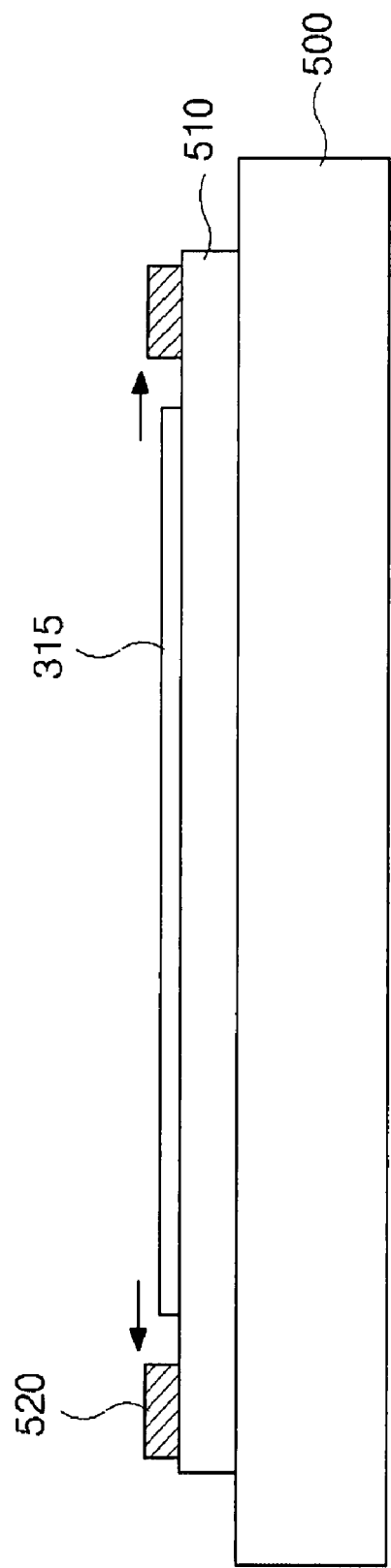
FIGS. 6A and 6B are views showing a spread process of a liquid crystal film in a liquid crystal injection method according to an embodiment of the present invention.
Figure 6B:
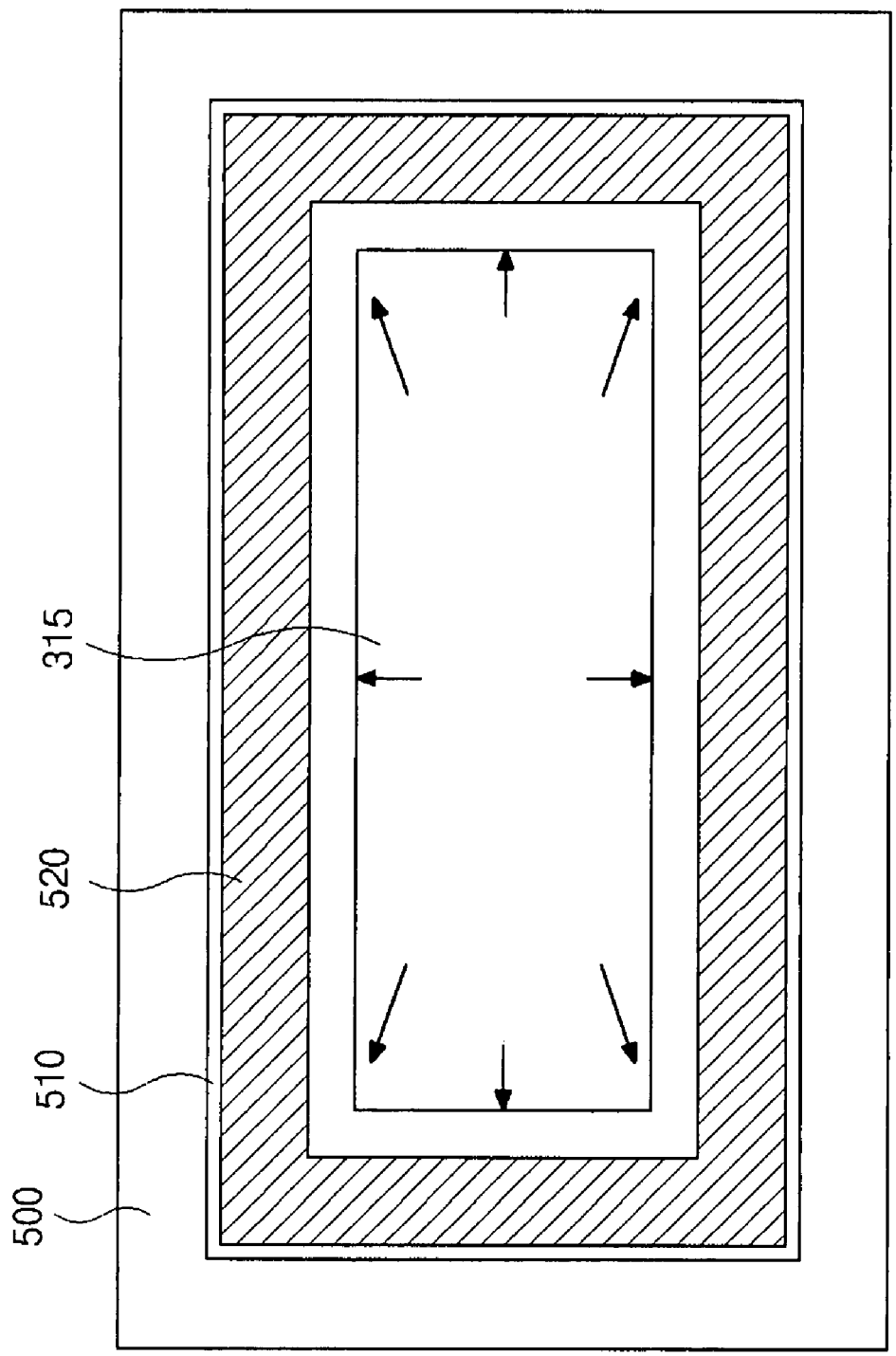

FIGS. 6A and 6B shows a spread process of the liquid crystal film 315 in the liquid crystal injection method according to an embodiment of the present invention. As shown in the drawings, the liquid crystal film 315 is printed on the substrate 510, on which a seal pattern 520 is formed. The seal pattern 520 serves to bond the substrate 510 and another substrate (not shown) together. The seal pattern 520 surrounds the effective display area of a liquid crystal cell, and is formed of thermosetting resin such as epoxy.

In an embodiment of the present invention, since the liquid crystal film 315 is printed on the substrate 510, an injection hole is not necessary and does not have to be sealed after the attachment process of substrates. Thus, the seal pattern 520 has a closed ring shape without any injection holes. The liquid crystal film 315 printed on the substrate 510 spreads toward the seal pattern 520. To minimize a distance that the liquid crystal film 315 spreads toward the seal pattern 520, the pattern mask 310 has a maximum size within a range allowed from the viewpoint of the process.

Figure 7A:
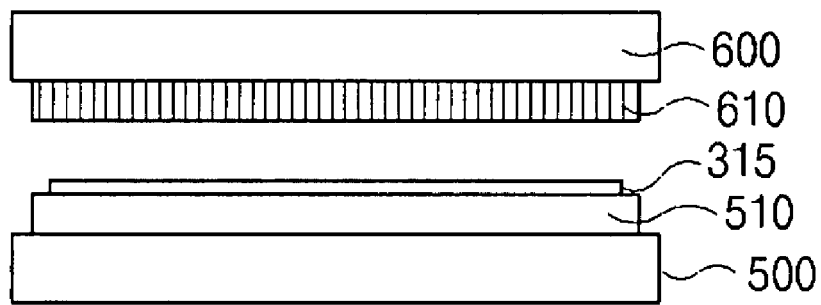
FIGS. 7A to 7C are cross-sectional views showing a process of attaching substrates for an LCD device after printing a liquid crystal film according to an embodiment of the present invention.
Figure 7B:
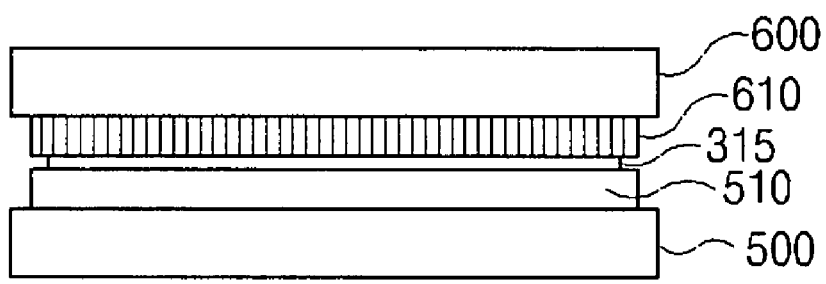
Figure 7C:
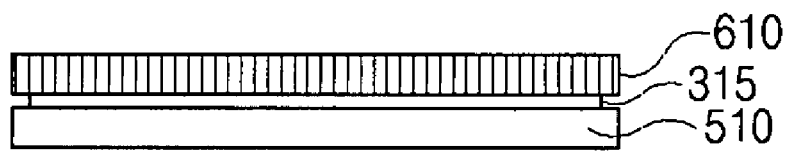

FIGS. 7A to 7C show a process of attaching substrates for an LCD device after printing the liquid crystal film 315 according to an embodiment of the present invention. In FIG. 7A, the first substrate 510 on the first substrate stage 500, which includes the liquid crystal film 315 thereon, is arranged with a second substrate 610 on a second substrate stage 600 such that the first and second substrates 510, 610 face each other.

In FIG. 7B, the first and second substrates 510, 610 are attached, wherein the liquid crystal film 315 is interposed between the first and second substrates 510, 610. At this time, the first and second substrate stages 500, 600 minutely move to accurately arrange the first and second substrates 510, 610. Meanwhile; a process for curing a seal pattern (not shown), which is formed between the first and second substrates 510, 610, is performed under a predetermined temperature for predetermined time, and two substrates 510, 610 are tightly bonded.

In FIG. 7C, a liquid crystal cell is completed by taking away the first and second substrate stages 500, 600. In an embodiment of the present invention, since the liquid crystal material is printed by using the pattern mask, it is easy to control a quantity of the liquid crystal material so that the flowing of the liquid crystal material on the substrate can be minimized. In addition, manufacturing process and time can also be decreased. Moreover, since the liquid crystal film has a uniform thickness, a cell gap is kept uniform.

It will be apparent to those skilled in the art that various modifications and variations can be made in method of fabricating an LCD device of the present invention without departing from the spirit or scope of the invention. Thus, it is intended that the present invention cover the modifications and variations of this invention provided they come within the scope of the appended claims and their equivalents.

What is claimed is:

1. A pattern mask for injecting a liquid crystal material, comprising:
   a mesh pattern on a surface of the pattern mask, the pattern mask for attaching a liquid crystal material, holding the liquid crystal material and printing a liquid crystal film on a substrate.

2. The pattern mask according to claim 1, wherein the mesh pattern comprises a plurality of prominences.

3. The pattern mask according to claim 2, wherein the prominences are arranged in a lattice form.

4. The pattern mask according to claim 2, wherein the liquid crystal material is attached inside the prominences.

5. The pattern mask according to claim 1, wherein the substrate has a seal pattern surrounding a display region thereon.

6. The pattern mask according to claim 5, wherein the seal pattern has a closed shape.

7. The pattern mask according to claim 1, wherein the pattern mask is formed of a plastic material or a metal material.

8. The pattern mask according to claim 1, wherein the liquid crystal film has about 5 to 10 μm thickness.

* * * * *